United States Statutory Invention Registration [19]

[11] Reg. Number: H630

Betts et al.

[43] Published: Apr. 4, 1989

[54] AGING GAUGE

[75] Inventors: Robert E. Betts; John F. Crawford, both of Huntsville, Ala.

[73] Assignee: The United States of America as represented by the Secretary of the Army, Washington, D.C.

[21] Appl. No.: 177,308

[22] Filed: Apr. 5, 1988

[51] Int. Cl.[4] ..... G01K 3/00; G01K 11/00

[52] U.S. Cl. ..... 374/106; 374/162; 252/962

[58] Field of Search ..... 374/1, 162, 16, 102, 374/106; 252/962

*Primary Examiner*—Stephen C. Buczinski
*Assistant Examiner*—Linda J. Wallace
*Attorney, Agent, or Firm*—John C. Garvin, Jr.; Freddie M. Bush; James T. Deaton

[57] ABSTRACT

An aging gauge comprising a container having a fixed or a variable sized vent opening with a cap which can be opened to control the sublimation rate of a thermally sublimational material contained within the container. In use, the aging gauge is stored with an item to determine total heat the item is subjected to and also the maximum temperature to which the item has been exposed. The aging gauge container contains a thermally sublimational material such as naphthalene or similar material which has a low sublimation rate over the temperature range from about 70° F. to about 160° F. The aging products determined by analyses of a like item aged along with the aging gauge for which the sublimation amount is determined is employed to establish a calibration curve for future aging evaluation. The aging gauge is provided with a means for determining the maximum temperature exposure (i.e., a thermally indicating material which gives an irreversible color change, Thermocolor pigment). Because of the relationship of doubling reaction rates for increases of 10° C., equivalency of item used in accelerated aging evaluation can be obtained by referring to a calibration curve depicting storage temperature on the abscissa scale and multiplier on the ordinate scale.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AGING GAUGE

DEDICATORY CLAUSE

The invention described herein may be manufactured, used, and licensed by or for the Government for governmental purposes without the payment to us of any royalties thereon.

BACKGROUND OF THE INVENTION

Estimating the useful life of production materials or a combination of these material is necessary, and particularly even of a higher magnitude of importance is the estimating of the effects of aging on solid propellant materials of solid propellant rocket motors.

Presently, items such as solid propellant rocket motors are stored in thermal environments which have little or no control and are seldom monitored. However, when monitored, devices such as recording thermometers are used. These thermometers can record the temperature extremes and temperature-time profile, and by integrating under a temperature curve, the temperature and total heat effects can be measured. Such equipment is costly, requires a constant energy source to operate, and monitors a general area and not a specific item in total.

Of particular interest and benefit would be a low cost item which can monitor specific items. For example, an aging device which can be attached directly to a specific item would be attractive. An aging device which can be attached directly to a specific item, and an aging device which is passive, would be particularly attractive since it requires no operating energy source.

Therefore, an object of this invention is to provide an aging device which requires no operating energy source.

Another object of this invention is to provide an aging device which can be attached directly to individual items for which aging data or information is desired.

Still another object of this invention is to provide an aging device which can provide an irreversible color change which can indicate the maximum temperature to which the item is exposed.

An additional object of this invention is to provide an aging device which can be employed with an item to correlate natural aging or an accelerated aging based on calibrated data obtained on the aging device and the item with which the aging device is stored.

SUMMARY OF THE INVENTION

The aging gauge of this invention comprises a container with a cap having a fixed opening or a variable sized vent which can be opened to control the sublimation rate of a thermally sublimational material contained within the container. In use, the aging gauge is stored with an item to determine total heat to which the item has been subjected and also the maximum temperature to which the item has been exposed. The aging gauge container contains a thermally sublimational material such as naphthalene or similar material which has a low sublimation rate over the temperature range from about 70° F. to about 160° F. The amount of sublimation over a time period is calibrated from comparison values along with the amount of aging products found to have taken place with a propellant composition subjected to a like temperature range. The calibration data serves to correlate propellant aging with the amount of sublimation from the aging gauge. This correlation gives a temperature versus time relationship which serves to predict the life of an item such as a propellant composition where chemical reaction rates are known, and their effects are known with respect to temperature and total heat exposure. The aging gauge is additionally provided with a series of thermocolor pigments which are formulated to yield irreversible color changes at a maximum temperature to which it is subjected. These pigments can be placed on the inside or outside of the aging gauge. The container for the aging gauge can be metal, glass, or plastic; and when clear glass or plastic, the quantity of low temperature sublimational material remaining can be observed. Likewise, the thermocolor pigment can be observed for irreversible color changes when placed on the inside of the container when the container is transparent.

DESCRIPTION OF THE PREFERRED EMBODIMENT

The aging gauge for determining the maximum temperature to which an item has been exposed is one of the features derived from the aging gauge of this invention.

Another feature and perhaps the most important one is a means for measurement of the total heat, based on the occurrence of certain events to which an item has been subjected.

Figure 1:
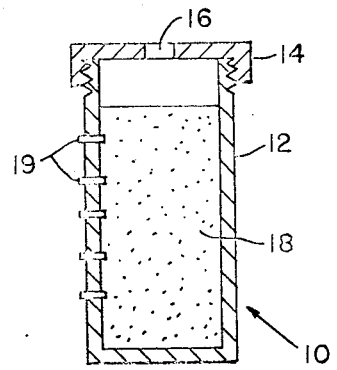
FIG. 1 depicts a schematic view of an aging gauge of this invention.

With reference to the drawing, FIG. 1 depicts an aging gauge 10 comprised of a container 12 which can be made of metal, glass, or plastic. The container 12 has a cap 14 with a variable sized opening 16 which serves as a vent hole. A thermally sublimational material (naphthalene) 18 is loaded into the container and then sealed. The aging gauge device is precisely weighed before and after the sublimational material is loaded into the container.

Figure 2:
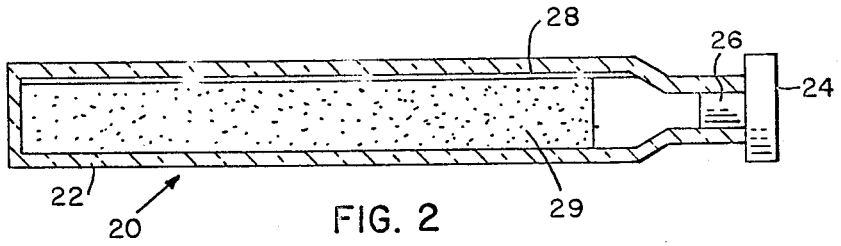
FIG. 2 depicts a schematic view of an unitary container containing a thermally sublimational compound, a temperature indicator, and a unitary container which has a fixed vent opening for yielding a constant sublimational reaction rate for the aging gauge.

FIG. 2 depicts another embodiment of an aging gauge 20 comprised of a glass or plastic container 22 and having a removable plug 24 for a fixed vent opening 26. An irreversible color changing pigment 28 serves to indicate the maximum temperature exposure reached. The sublimational material 29 is shown inside container 22 in a predetermined amount which can be measured with time elapse by observing the level or by weight loss determination.

After the aging gauge or device is loaded and precisely weighed, it is then sealed. When put in use by storing with an item for aging evaluation, the vent of the aging gauge is opened and when the vent is opened, the thermally sublimational material sublimes at a rate depending on temperature. The weight changes can be measured with time or in the case of an aging gauqe with a glass or transparent container the level of thermally sublimational material can be measured or observed to determine the amount sublimated. Knowing the aging characteristics of the stored item such as a rocket motor and the sublimation quantity based on exposure to a certain quantity of heat, then with the two items stored together, a correlation of the aging gauge and the aging characteristics can be closely related whereby the change due to a known sublimational reaction translates to a meaningful aging gauge for the stored rocket motor.

After the sublimational chemical is loaded, either a precise weight or volume is recorded. In the case of volume comparison, the liner length may be used to measure rate regression if all but one surface is inhibited. Thus, by storing gauges at several elevated temperatures, a calibration curve can be obtained giving a temperature versus time relationship for any given temperature with a given sized vent hole.

A thermally indicating material is added to the side of the aging gauge container so after being exposed to a maximum temperature, a irreversible color change takes place at a given maximum temperature. The described material in the form of irreversible color changing pigment is sold under the trademark Thermocolor of BASF-Wyandotte, Wyandotte, Mich. 48192.

As noted by further reference to FIG. 1, thermally indicating material 19 having a wide range of color changes can be selected to cover from ambient temperature to an accelerated aging temperature (from about 70° F. to about 160° F.) to determine the highest temperature to which a stored item has been subjected. If a number of aging gauges with a wide range of thermally indicating materials are placed on rocket motors at selected locations, then hot spots can be detected by reference to the color changes irreversibly made. This type information can be of value in predicting what reactions or changes have taken place in an area such as in the propellant grain, or in a composite insulation material, etc. This correlation with the history of the sublimational portion of the aging gauge provides information which by further evaluation and interpretation is indicative of whether the item, such as a rocket motor, has deteriorated to a point at which it should be pulled from normal, reliable service.

Figure 3:
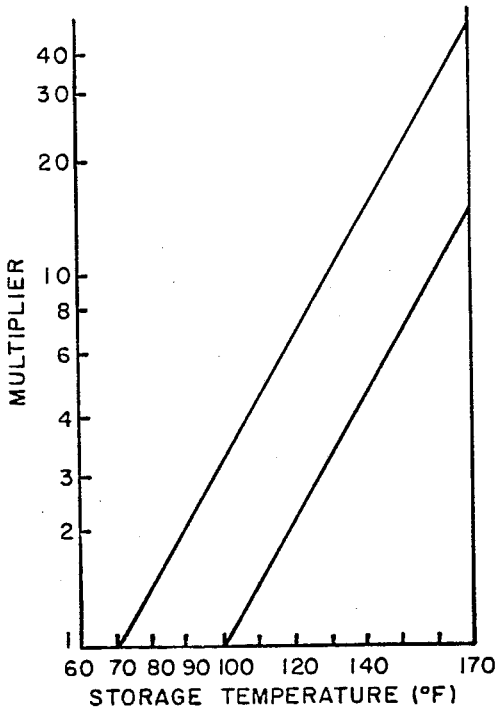
FIG. 3 depicts an accelerated aging evaluation curve for aging temperatures of 70° F., 145° F., and 165° F.

In further reference to FIG. 3, it is noted that the equivalency of time used in accelerated aging evaluation is based on a long established reaction phenomenon; that is, with a temperature increase of each 10° C. or about 18° F., the reaction rate doubles. Thus, the multiplier value on the ordinate scale projects a reaction rate of 1.0 at 100° F.; however, when the storage temperature is raised to about 154° F., the reaction rate is about 8 times what it would be at a storage temperature of about 100° F. The ambient temperature of 70° F. when raised to about 160° F. results in the reaction rate being increased from about 1.0 at 70° F. to about 35 times the rate when elevated to 160° F. Being interpreted further in terms of one day at 70° F. the aging equivalent based on reaction products formed at 160° F. translate to about 41 minutes. Additional equivalent accelerated aging values relationships are set forth in Table I below for ambient, 145° F., and 165° F. compared with ambient temperature of 70° F.

TABLE I

| At 145° F. | | At 70° F. | | At 165° F. |
|---|---|---|---|---|
| 1 hr 20 min | = | 1 Day | = | 41 min |
| 9 hr 20 min | = | 1 Week | = | 4 hr 48 min |
| 40 hr | = | 1 Month | = | 20½ hr |
| 10.1 Days | = | 6 Months | = | 5¼ Days |
| 20¼ Days | = | 1 Year | = | 10½ Days |
| 40½ Days | = | 2 Years | = | 20.8 Days |
| 81 Days | = | 5 Years | = | 41¾ Days |
| 162¼ Days | = | 10 Years | = | 83½ Days |

Figure 4:
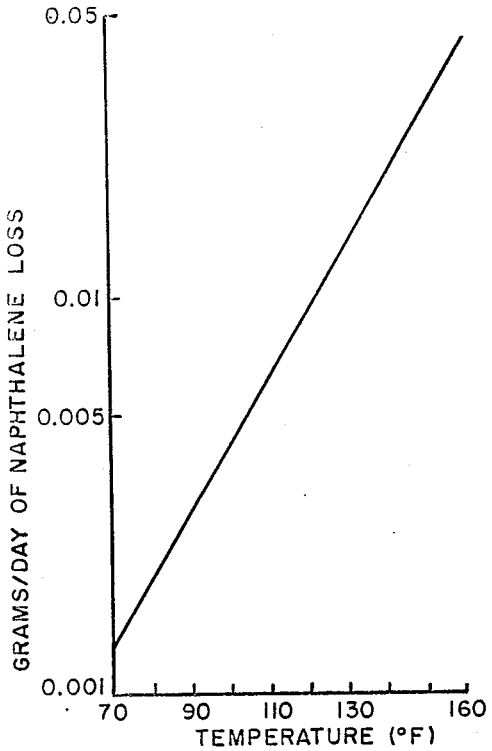
FIG. 4 is a calibration curve depicting grams/day loss of naphthalene through a fixed sized vent hole over a temperature range of 70° F.–160° F.
Figure 5:
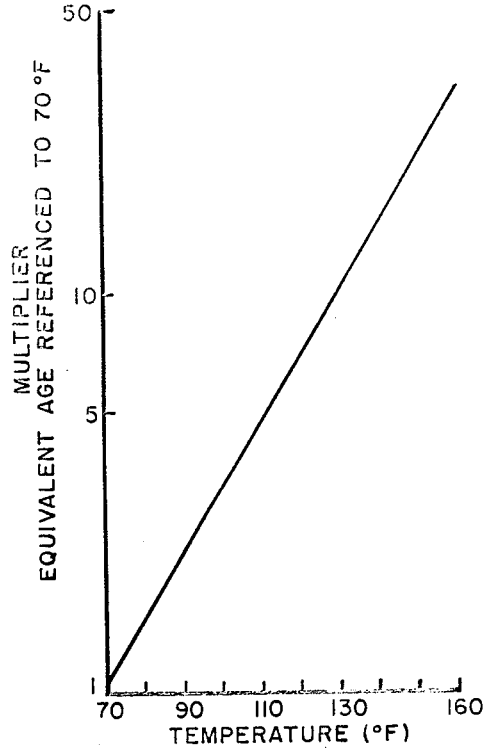
FIG. 5 depicts a multiplier equivalent age referenced to 70° F. and calculated from the naphthalene loss through a fixed size vent hole.

In further reference to FIG. 4 which is a calibration curve depicting grams/day loss of naphthalene through a 0.325 inch diameter vent opening, and in further reference to FIG. 5 which is a multiplier equivalent age referenced to 70° F. and calculated for an extended time, it is concluded that the rate of loss of 70° F. and 160° F. follows the rule of thumb which depicts a doubling of the reaction rate for every 10° C. or 18° F. which also coincides with the accelerated aging data shown hereinabove and depicted in FIG. 3.

Figure 6:
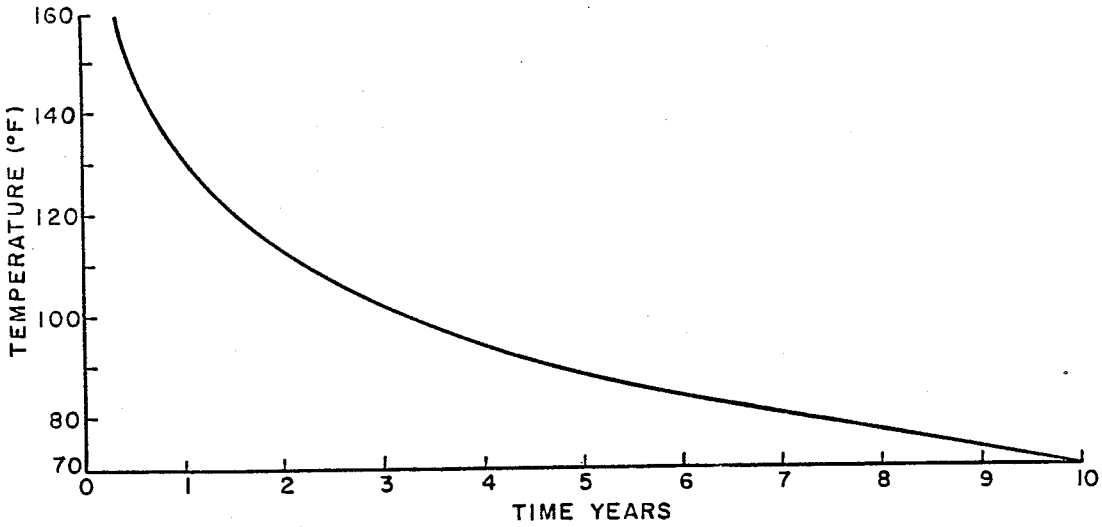
FIG. 6 depicts operational limits for temperature range 70° F.–160° F. versus time scale of 10 years.

In further reference to FIG. 6 which depicts the operational and non-operational time limits based on a deviation from 70° F. and a storage life of 10 years, the remaining time of useful life can be predicted as further disclosed hereinbelow.

In evaluating the aging gauge vent hole diameter, it has been found that the vent hole must be greater than 0.125 inches diameter to be useful (i.e., sublimates without restricting the opening). An aging gauge with a 0.325 inch diameter vent hole looses naphthalene at a rate as follows:

0.00134 grams/day at 70° F.

0.04245 grams/day at 160° F.

The calculated loss per year is 0.475 grams or 4.75 grams per 10 years. The rate of loss at 160° F. when compared to 70° F. is about a 32 times increase which follows the rule of thumb (for every 10° C. increase in temperature, a chemical reaction rate doubles) and which also coincides with the operational temperature curve, FIG. 3.

The following working example indicates the usefulness of the aging gauge. An aging gauge with a vent hole of 0.325 is placed next to a stored item. The gauge contains 5.0 grams of naphthalene. In three years the loss of naphthalene is three grams. Since the rate loss at 70° F. is 0.00134 grams/day the equivalent aging time is 3.0 grams/0.4252 year or 6.31 years. Conclusion: The item has experienced a thermal environment to give an equivalent age of 6.31 years at 70° F. The item then has only 3.69 years storage life left, if the remaining time is at 70° F.

Aging in a thermal environment is assumed to occur at an exponential rate which doubles every 10° C. The weight loss of material in the aging gauge is at about the same exponential rate with temperature increases; therefore, the weight loss can be correlated to an equivalent age. Storage life is referenced to 70° F. and can be projected for storage times at elevated temperature.

We claim:

1. An aging gauge for a component of a solid propellant rocket motor wherein said component when aged for predetermined time periods and predetermined temperatures forms aging prducts which can be determined by analyses methods, said aging gauge comprising:

(i) a container for containing a thermally sublimational material;

(ii) an opening having a removable seal in said container which said opening is normally sealed after loading said thermally sublimational material into said container and when said aging gauge is placed into service said seal is effectively removed, said opening then serving as a vent for a measurable sublimination reaction;

(iii) a predetermined amount of a thermally sublimational material loaded into said container, said thermally sublimational material characterized by having a low sublimation rate over the temperature range from about 70° F. to about 160° F. and by having a measurable loss amount of said thermally sublimational material after an elapsed aging time period for comparison with the amount of aging products found in a component of a solid propellant rocket motor aged with said aging gauge for a like elapsed time period to establish calibration data for said aging gauge whereby an aging gauge of a like construction serves to determine the total heat that a component of a solid propellant rocket motor has been subjected to and which serves to determine the aging products expected to be presented from a comparison of the sublimation amounts with the analyses determined aging products present when a calibration curve is established for said aging gauge; and, (iv) means affixed to said aging gauge for determining the maximum temperature to which said aging gauge is subjected to during aging service.

2. The aging gauge as defined in claim 1 wherein said thermally sublimational material placed in said container is naphthalene.

3. The aging gauge as defined in claim 2 wherein said container is a unitary container and wherein said opening is a predetermined fixed vent opening size for yielding a constant sublimation rate.

4. The aging gauge as defined by claim 3 wherein means affixed to said aging gauge for determining the maximum temperature to which said aging gauge is subjected are in the form of irreversible color changing pigments covering said temperature range of said aging gauge.

5. The aging gauge as defined in claim 2 wherein said container is provided with a removable cap having an opening whereby said opening achieves a variable sublimation rate proportional to said opening and the temperature to which said aging gauge is subjected.

6. The aging gauge as defined by claim 5 wherein means affixed to said aging gauge for determining the maximum temperture to which said aging gauge is subjected are in the form of irreversible color changing pigments covering said temperature range of said aging gauge.

* * * * *